Feb. 17, 1931.         F. MIEDER         1,792,919
CLARIFYING PLANT
Filed March 29, 1928
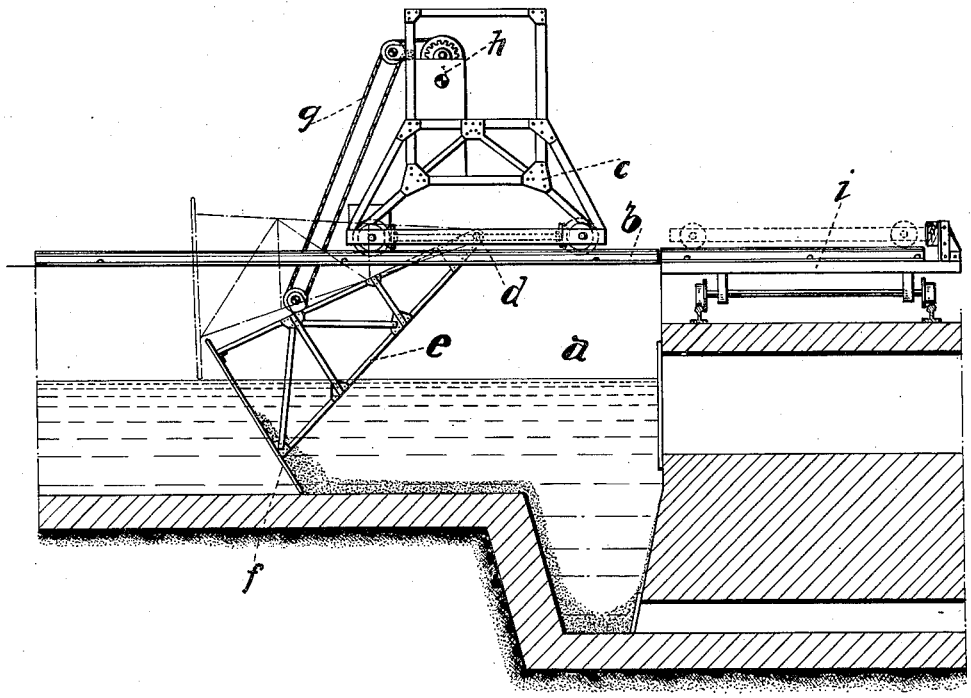

Patented Feb. 17, 1931

1,792,919

UNITED STATES PATENT OFFICE

FRITZ MIEDER, OF LEIPZIG, GERMANY

CLARIFYING PLANT

Application filed March 29, 1928, Serial No. 265,624, and in Germany April 4, 1927.

This invention relates to clarifying plants and more particularly to a device which is used in connection with plants of this kind, said device serving for the removal of the sediment depositing on the bottom of the clarifying reservoir.

As well known, in reservoirs of clarifying plants there is generally formed in the first place a sediment at the bottom of the reservoir and in the second place a further more or less floating layer on the liquid contained in the plant. This sediment as well as this floating layer must be removed at intervals. The floating layer as a rule will be of a smaller thickness than the sediment so that the former does not need to be removed as frequently as the latter. According to the present practice the sediment is either removed after letting off the water or other liquid which is contained in the reservoir or this sediment is removed with the water or liquid contained in said reservoir. For this purpose scrapers or similar devices are used which are adapted to collect the sediment at a certain place of the reservoir, whence the sediment is removed from the latter. By letting off the water or other liquid from the reservoir the operation of the clarifying plant evidently will be interrupted for some time so that further reservoirs must be provided which serve as a reserve during cleaning of the first mentioned reservoir. Such additional reservoirs apparently essentially increase the first cost as well as the cost of maintenance of the plant. If before letting off the water or other liquid the above-mentioned floating layer is not removed this layer will become again mixed up with the sediment positioned on the bottom of the reservoir. This mixing of the sediment with the floating layer is most undesirable. On the other hand according to the methods now in use, especially in case of reservoirs of large dimensions it will be difficult as well as uneconomical to remove the said floating layer every time before the water or liquid is let off the reservoir. This is due to the fact that said floating layer does not form as quickly as the sediment which is positioned on the bottom of the reservoir.

If the sediment is removed from the reservoir with the water or other liquid contained therein, the scrapers or similar devices which serve for removing the sediment must be operated very carefully and slowly not only in its forward or operating motion but also during its rearward inoperative motion in order to prevent the deposited sediment from being whirled about and again mixed with the water or other liquid of the clarifying plant. The work connected with the motion of the scraper consequently becomes quite cumbersome and requires considerable time. In plants of the present kind the sediment is removed while retaining the water or other liquid in the reservoir and the scrapers or similar devices which cannot be taken out of the reservoir must permanently remain within the liquid. On account of the fact that the scrapers are always retained within the liquid, the effective cross-section of the reservoir will be essentially reduced at that point at which said scrapers are positioned when inoperative. By this the uniformity of the passage as well as the velocity of flow of the water or other liquid through the reservoir will be unfavorably affected, and in addition to this said scrapers or similar devices will be subject to soiling. On account of the fact that in ordinary constructions of plants of the present kind the scraper or similar device cannot be taken out of the reservoir, each reservoir, even if a greater number of such reservoirs are employed adjacent to each other a special scraper or similar device, must be provided for each individual reservoir. Also in this case an additional scraper or similar device will be necessary which serves for the removal of the above-mentioned floating layer, and the actuation of said additional scraper will be rendered difficult on account of the presence of the other scraper which serves for the removal of the lowermost sediment.

This invention now has for its primary object to provide a device which permits to remove the sediment from the water or other liquid of the reservoir, as well as the said floating layer. According to this invention the said device consists essentially of a carriage which is mounted upon the walls of the clarifying reservoir so as to be movable along said reservoir, and a scraper or similar device is associated with said carriage in a manner to permit lifting and lowering of said scraper or similar device. In addition to this, according to this invention the scraper or similar device extends all over the width of the reservoir and is of a conformation similar to that of the cross-section of said reservoir. A unitary device will thus be obtained by means of which according to requirements either the under sediment or upper floating layer may be removed, either as a whole or in the form of layers of greater or smaller thickness. This is accomplished by merely operating the scraper at a different height. Besides, by arranging the scraper or similar device in such a manner that it may be raised to be positioned entirely out of the water or other liquid it will be possible to accelerate the no-load rearward motion of said scraper and to enable the entire device to be mounted upon a carriage, travelling platform or the like so as to be moved from one reservoir to another.

In the accompanying drawing I have shown a constructional form of my present scraper or similar device in a diagrammatic view, the reservoir of the clarifying plant being shown in a longitudinal section. The clarifying reservoir or channel $a$ is provided with walls upon which there is mounted a pair of rails $b$ for a carriage or travelling platform $c$ which may be moved at an adjustable velocity either by hand or by means of motor power. Lattice-trusses $e$ are pivotally mounted upon the carriage or travelling platform at the point $d$ thereof, said lattice-trusses carrying at their extreme end a scraper or similar device $f$. This scraper is of such width as to extend all over the width of the reservoir or channel $a$ and of a conformation similar to the cross-section of the latter. A winch $h$ as shown in the drawing is provided on the frame work of said carriage or platform $c$, said winch serving for lifting or lowering the trusses $e$ by means of a rope $g$ and pulleys as indicated in the drawing. The scraper $f$ may now be properly adjusted in vertical direction so as to either move along the bottom of the reservoir during motion of said carriage or travelling platform $c$ and carry the entire sediment towards the sink-hole of the reservoir or so as to extend only to a limited depth into the water or other liquid of the reservoir and during motion of the carriage or platform $c$ only remove the floating layer. In addition to this the scraper $f$ may be entirely taken out of the liquid as indicated in dotted lines in the drawing in order to enable said scraper of being moved at a greater velocity during its rearward no-load motion. Raising and lowering of the scraper $f$ may also be accomplished in other ways than described and shown herein.

If several channels or reservoirs are arranged adjacent to each other preferably a further traverse table $i$ travelling platform or the like may be provided in order to be able to use the device according to this invention for all of said channels or reservoirs.

On account of the fact that by means of the device according to this invention the sediment may be easily and effectively removed from the reservoir, the device may be also advantageously employed in connection with plants having putrefying reservoirs which are placed adjacent to each other in which putrefying gas is used for heating the putrefying reservoirs and the putrefying process of the sediment is accelerated and used for the formation of a greater quantity of gas.

I claim:

A clarifying plant comprising a reservoir having a channel and a sink hole at one end of the channel and the bottom of which is lower than that of the channel; a carriage mounted for movement longitudinally of and above the channel and a vertically movable scraper carried by the carriage and arranged in, extending across and corresponding in width and shape with the cross section of the channel, to simultaneously scrape the bottom and walls of the channel and remove sediment therefrom and discharge such sediment into the sink hole when the scraper is in lowered position and the carriage is moved in the required direction, and to remove floating sediment from the channel when the scraper is raised to the required height and so moved by the carriage.

In testimony whereof I affix my signature.

FRITZ MIEDER.